US011012765B2

(12) United States Patent
Widmann et al.

(10) Patent No.: US 11,012,765 B2
(45) Date of Patent: May 18, 2021

(54) METHODS AND SYSTEMS FOR MANAGING CONNECTOR ARRAYS

(71) Applicant: Extreme Networks, Inc., San Jose, CA (US)

(72) Inventors: Christopher A. Widmann, Apex, NC (US); Bruce R. Sanfelici, Durham, NC (US); Peter M. Howarth, Holly Springs, NC (US); Ting-Feng Fan, Taoyuan (TW)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/137,005

(22) Filed: Sep. 20, 2018

(65) Prior Publication Data

US 2019/0215585 A1 Jul. 11, 2019

Related U.S. Application Data

(60) Provisional application No. 62/615,844, filed on Jan. 10, 2018.

(51) Int. Cl.
*H04Q 1/04* (2006.01)
*H01R 13/15* (2006.01)
(Continued)

(52) U.S. Cl.
CPC ......... *H04Q 11/0005* (2013.01); *H01R 13/15* (2013.01); *H01R 13/6272* (2013.01);
(Continued)

(58) Field of Classification Search
CPC ...... H01R 13/518; H01R 13/639–6395; H01R 13/6273; H01R 13/15; H01R 13/6272;
(Continued)

(56) References Cited

U.S. PATENT DOCUMENTS 3,648,223 A * 3/1972 McCray ............... H01R 13/639
439/368
4,536,047 A * 8/1985 Varone ............... H01R 13/6395
439/330
(Continued)

OTHER PUBLICATIONS

International Search Report and Written Opinion of the International Searching Authority directed to related International Patent Application No. PCT/US19/12072, dated Apr. 24, 2019; 8 pages.

*Primary Examiner* — Gary F Paumen
(74) *Attorney, Agent, or Firm* — Sterne, Kessler, Goldstein & Fox P.L.L.C.

(57) ABSTRACT

A system is configured to manage connectors configured to engage with corresponding connector ports. The system maintains the relative position of the connectors. For example, the connectors can be plugged into, or unplugged from, a network component, while retaining a desired arrangement. In some embodiments, the system includes one or more connector blocks, one or more cable blocks, one or more crossbars, one or more latching mechanisms, or a combination thereof. The connector blocks engage the connector tab of each connector, allowing the connector to be inserted/removed without a user having to engage/disengage each connector tab by hand. The cable blocks maintain a relative position among connectors and cables. The crossbar rigidly couples the connector blocks together and provides a rigid connection to a mounting reference such as, for example, a standard networking rack. The latching mechanisms secure and release the crossbar from the mounting reference.

20 Claims, 14 Drawing Sheets

(51) Int. Cl.
  *H01R 24/64* (2011.01)
  *H04Q 11/00* (2006.01)
  *H01R 13/627* (2006.01)

(52) U.S. Cl.
  CPC ......... *H01R 13/6273* (2013.01); *H01R 24/64* (2013.01); *H04Q 1/04* (2013.01); *H04Q 2011/0058* (2013.01)

(58) Field of Classification Search
  CPC .. H01R 24/64; H04Q 11/005; H04Q 11/0005; H04Q 1/04; H04Q 2011/0058
  USPC .......................... 439/540.1, 541.5, 352, 368
  See application file for complete search history.

(56) References Cited

U.S. PATENT DOCUMENTS

| | | | |
|---|---|---|---|
| 5,178,554 A | 1/1993 | Siemon et al. | |
| 6,077,113 A * | 6/2000 | Lecomte | H01R 13/518 439/471 |
| 6,307,997 B1 | 10/2001 | Walters et al. | |
| 7,517,241 B2 * | 4/2009 | Gundlach | H01R 13/6335 439/344 |
| 8,602,807 B2 * | 12/2013 | Wojcik | H01R 13/506 439/352 |
| 9,179,571 B2 * | 11/2015 | Rossman | H05K 7/1447 |
| 9,699,936 B1 * | 7/2017 | Vargas | H05K 7/183 |
| 9,888,603 B1 * | 2/2018 | Vargas | H05K 7/14 |
| 2004/0235344 A1 * | 11/2004 | Kleeberger | H01R 13/6215 439/540.1 |
| 2006/0256540 A1 | 11/2006 | AbuGhazaleh et al. | |
| 2008/0096438 A1 * | 4/2008 | Clark | H01R 13/518 439/713 |
| 2010/0068923 A1 * | 3/2010 | Tabet | H01R 13/518 439/540.1 |
| 2010/0221932 A1 * | 9/2010 | Pepe | H01R 13/514 439/78 |
| 2010/0255716 A1 * | 10/2010 | Frey | H04Q 1/13 439/540.1 |
| 2014/0270675 A1 * | 9/2014 | Yu | G02B 6/3898 385/135 |
| 2015/0296666 A1 | 10/2015 | Soo Hoo et al. | |
| 2016/0254620 A1 | 9/2016 | O'Young et al. | |

* cited by examiner

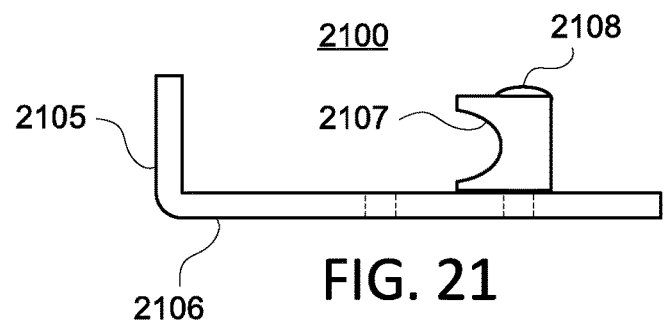
FIG. 21
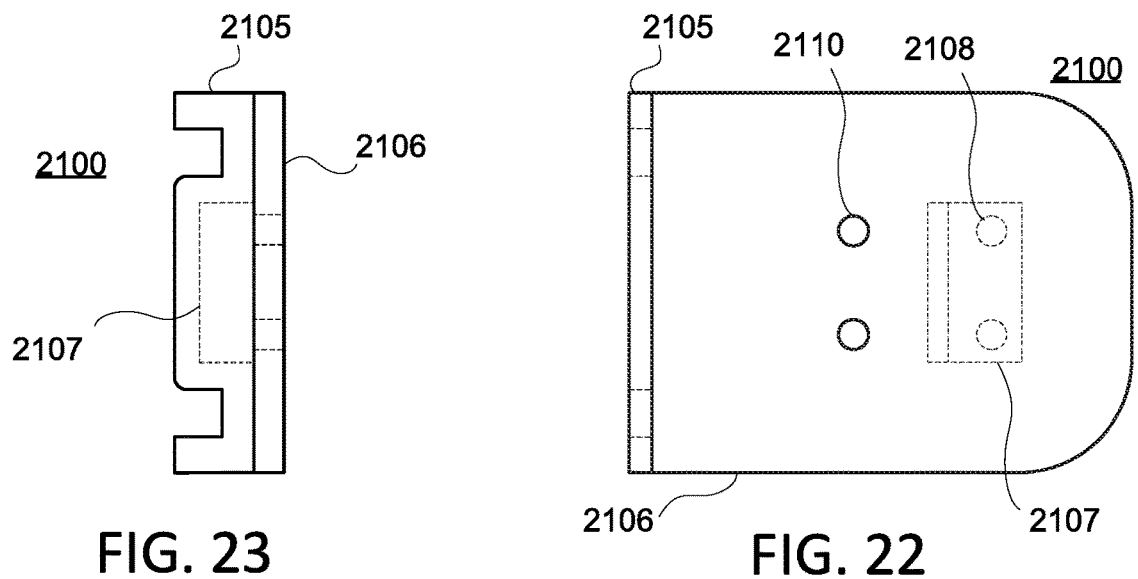
FIG. 23
FIG. 22
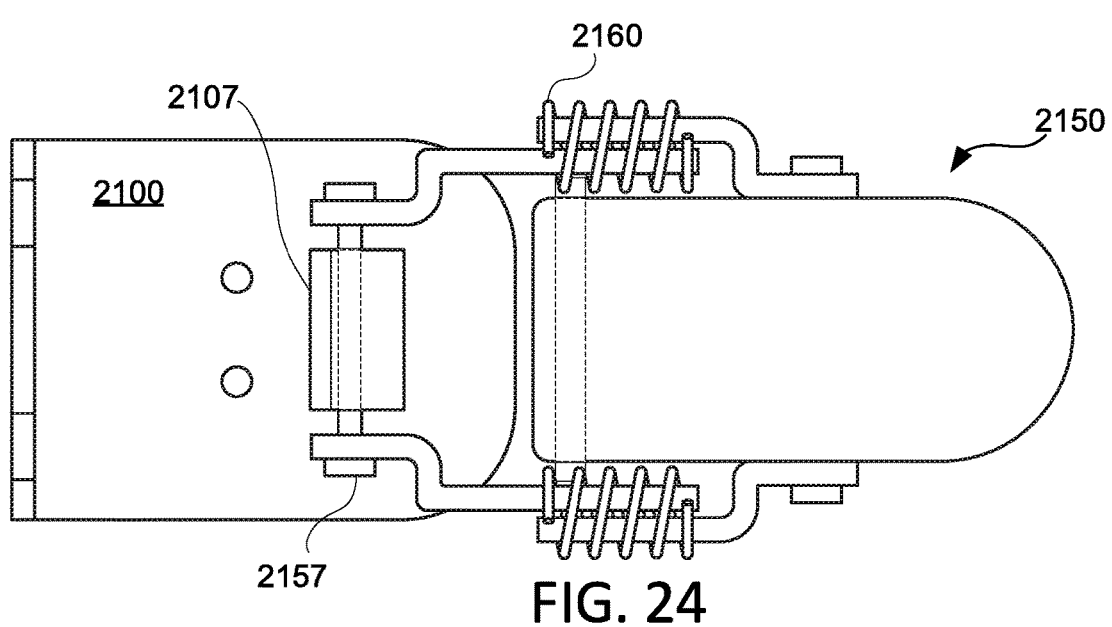
FIG. 24

METHODS AND SYSTEMS FOR MANAGING CONNECTOR ARRAYS

CROSS REFERENCE TO RELATED APPLICATIONS

This application claims the benefit of U.S. Provisional Patent Application No. 62/615,844, filed Jan. 10, 2018, the disclosure of which is hereby incorporated by reference herein in its entirety.

BACKGROUND

Network devices typically include multiple wired connections. Some, if not all, of the connections are arranged in one or more arrays. The removal of any one connection can present challenges, in terms of accessibility and selection. For example, RJ45 connectors and ports may be arranged in a tight array, with little room for a user's hands. The removal of multiple connections at the same time gives rise to the possibility of re-plugging one or more connectors into different ports than those from which they were removed. In some circumstances, plugging a connector into an incorrect port can lead to electrical damage, mechanical damage, or both. It would be advantageous to be able to remove multiple wired connections with a convenient action, and without specialized training, while maintaining the spatial arrangement of the connections.

SUMMARY

In some embodiments, the present disclosure is directed to a system for managing a plurality of connectors, each having a corresponding cable and interfacing with a component having a plurality of connector ports. In some embodiments, the system includes a connector block and a crossbar. The connector block includes at least two connector bays and at least two respective spring tabs. The at least two connector bays are arranged in an array matching at least two corresponding connector ports. The at least two respective spring tabs each correspond to a respective connector bay of the at least two connector bays, and are configured to depress a connector tab of a respective connector. The crossbar is configured to interface with a mounting reference and secure the connector block to prevent relative motion between the connector block and the mounting reference.

In some embodiments, the system includes a latching mechanism, and the crossbar is configured to interface with the mounting reference using the latching mechanism.

In some embodiments, the mounting reference is a standard rack such as, for example, a 19-inch rack.

In some embodiments, the component is selected from the group consisting of a network switch, a network router, a network patch panel, and a network server.

In some embodiments, the plurality of connector ports includes a plurality of RJ45 ports.

In some embodiments, the array includes a first row and a second row, and the first row and the second row each include a same number of connector ports as the other.

In some embodiments, each of the connector ports is configured to engage with a respective connector tab, and each connector bay prevents the respective connector port from engaging with the respective connector tab. Accordingly, each connector tab does not need to be released from the connector port individually.

In some embodiments, the latching mechanism includes at least one spring-loaded clamp. The at least one spring-loaded clamp, when latched, is configured to impart a force on the crossbar which is reacted against the connector block. Further, the force is transmitted from the connector block to each respective connector reacted against the component. The at least one spring-loaded clamp, when de-latched, is configured to release the force on the crossbar.

In some embodiments, the connector block includes at least one fastener corresponding to each of the at least two connector bays, which is configured to secure the respective connector of the plurality of connectors.

In some embodiments, the system includes a cable block configured to maintain a relative arrangement of two or more cables of the corresponding cables.

In some embodiments, the connector block is a first connector block, and the system includes a second connector block. In some such embodiments, the second connector block includes at least two second connector bays arranged in a second array matching at least two second corresponding connector ports. The second connector block also includes at least two respective second spring tabs, each corresponding to a respective second connector bay of the at least two connector bays, and which are configured to depress a connector tab of a respective second connector. Further, the crossbar is further configured to secure the second connector block to prevent relative motion between the second connector block and the mounting reference.

In some embodiments, the present disclosure is directed to a system for managing a first set of connectors, each having a corresponding cable and being configured to interface to a component at a first connector port array, and a second set of connectors, each having a corresponding cable and configured to interface to the component at a second connector port array, wherein the component is mounted to a rack. In some embodiments, the system includes a connector block, a cable block, a crossbar, and a latching mechanism. The connector block is configured to arrange the first set of connectors in the first array and rigidly maintain respective relative positions among the first set of connectors. The cable block is configured to arrange the corresponding cables of the second set of connectors relative to each other in the second array. The crossbar is configured to rigidly couple the connector block and the cable block to each other. The latching mechanism is configured to secure and release the crossbar to and from the rack.

In some embodiments, the latching mechanism, when latched, is configured to prevent relative motion between the connector block and the rack, and prevent relative motion between the cable block and the rack.

In some embodiments, the latching mechanism includes two latches, and each latch is configured to secure and the release the crossbar to and from the rack by a single motion.

In some embodiments, the present disclosure is directed to a method for managing a plurality of connectors, each having a corresponding cable and being configured to interface to a component at a connector port array, wherein the component is mounted to a rack. The method includes securing each respective connector of the plurality of connectors to a respective connector bay of a connector block, engaging each respective connector with a respective connector port of the connector port array, securing a crossbar to the rack using at least one latching mechanism, and securing the connector block to the crossbar.

In some embodiments, securing the crossbar to the rack includes using a latching mechanism to secure the crossbar to the rack.

In some embodiments, securing each connector of the plurality of connectors to a respective connector bay of the connector block includes tightening a respective threaded fastener of the respective connector bay against the respective connector.

In some embodiments, securing each connector of the plurality of connectors to a respective connector bay of the connector block includes inserting the respective connector into the respective connector bay.

In some embodiments, the method includes releasing the secured crossbar from the rack. For example, in some embodiments, releasing the secured crossbar from the rack includes releasing the latching mechanism.

In some embodiments, the method includes selecting the connector block based at least in part on the component. For example, in some embodiments, components from different manufacturers include different connector port array geometries, and accordingly each component has a corresponding connector block.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 21 shows a top view of an illustrative latching component, in accordance with some embodiments of the present disclosure;

FIG. 22 shows a side view of the illustrative latching component of FIG. 21, in accordance with some embodiments of the present disclosure;

FIG. 23 shows a front view of the illustrative latching component of FIG. 21, in accordance with some embodiments of the present disclosure;

FIG. 24 shows a side view of the illustrative latching component of FIG. 21, and a latching mechanism, in accordance with some embodiments of the present disclosure;

DETAILED DESCRIPTION

The present disclosure is directed to systems for managing multiple connectors that interface to a network component. In some embodiments, systems, methods, and apparatuses are disclosed herein for enabling efficient removal and replacement of a panel of a device (e.g., a front panel of a switch), or the device itself, without requiring removal of each of the individual cables plugged into this switch. In some embodiments, the present disclosure enables a non-technical person (e.g., a non-IT person) to swap out a failing switch quickly and not plug connectors into the wrong ports. The present disclosure may be applied to a cabling interface of a device such as, for example, a switch (e.g., a 1RU switch), to have its ports contained within an assembly that would permit these ports to be plugged and unplugged from this switch in one motion. The present disclosure does not require, although it may accommodate, use of a proprietary connector. For example, existing cabling and connectors are compatible with the present disclosure. Further, the present disclosure may be applied to network components from any manufacturer such as, for example, Extreme Networks, Cisco, HP, Arista, etc.

In some circumstances, a network system includes several components such as, for example, a rack, a network switch, a network router, a network patch panel, a server, cable management, and other suitable equipment. Some components include one or more arrays of connector ports, configured to interface to corresponding connectors. For example, a network switch may include an array of 2N RJ45 ports, arranged into two rows of N ports. In an illustrative example, a network patch panel may include four arrays, each including sixteen RJ45 ports (i.e., sixty-four ports in total), and arranged in four 2×8 arrays.

In some embodiments, the systems and techniques described herein may be applied to suitable network components in a relatively low-cost implementation. For example, the present disclosure allows easy plug-in and movement of any suitable number of ports at a time. To illustrate, some illustrative systems include up to forty-eight or fifty-two ports, but newer systems with even larger numbers of ports are still within the scope of this disclosure. Further, the present disclosure may be applied to accommodate proprietary cables or unique switches. For example, the present disclosure may be applied to any suitable networking device having RJ45 connectors and fitting a rack of ISO and IEEE standards (e.g., a 19-inch rack).

Figure 1:
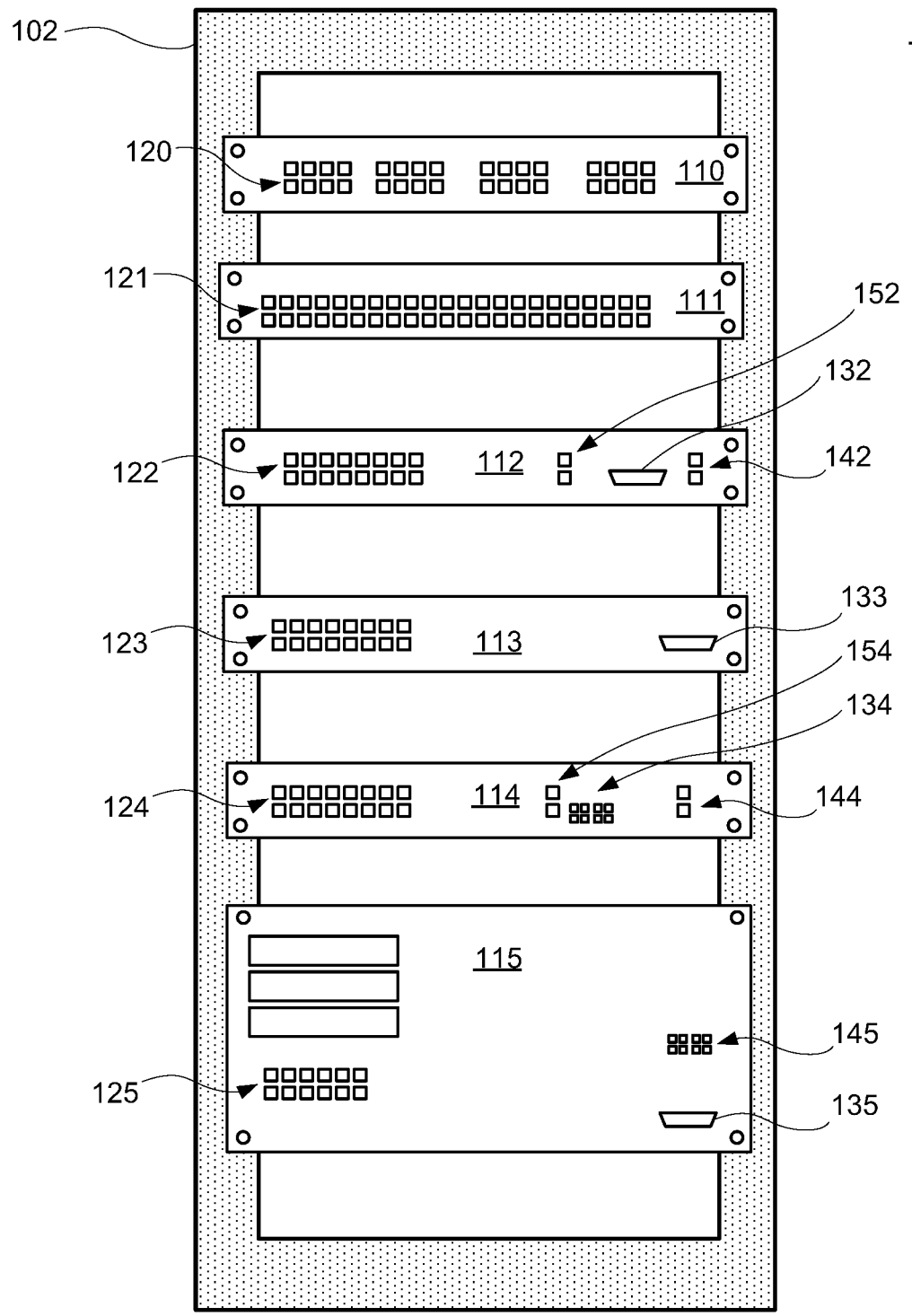
FIG. 1 shows a front view of an illustrative network system, in accordance with some embodiments of the present disclosure.

FIG. 1 shows a front view of illustrative network system 100, in accordance with some embodiments of the present disclosure. Network system 100 includes rack 102, and network components 110-115. Network components 110-115 are rigidly affixed to rack 102. In some embodiments, rack 102 includes a standard 19-inch rack, having standard rack unit (RU) spacing and mounting holes. Each of network components 110-115 may be 1U or larger and may accordingly mount to a position of rack 102. A plurality of cables having connectors may couple network components 110-115 to each other and components outside of network system 100. Accordingly, each of network components 110-115 may interface to multiple cables via corresponding connectors.

Network component 110 includes array 120 of connector ports, arranged in four groups of 2×4 smaller arrays. For example, as illustrated, array 120 includes thirty-two RJ45 connector ports.

Network component 111 includes array 121 of 2×22 connector ports (i.e., forty-four connector ports in total). For example, as illustrated, array 121 includes forty-four RJ45 connector ports.

Network component 112 includes array 122 of 2×8 connector ports (i.e., sixteen connector ports in total), array 152 of 2×1 connector ports, array 142 of 2×1 connector ports, and power port 132 (e.g., which may be used to provide power to network component 112). For example, as illustrated, array 122 includes sixteen RJ45 connector ports, while network component 112 includes twenty RJ45 connector ports in total.

Network component 113 includes array 123 of 2×8 connector ports (i.e., sixteen connector ports in total), and power port 132 (e.g., which may be used to provide power to network component 113). For example, as illustrated, array 123 includes sixteen RJ45 connector ports.

Network component 114 includes array 124 of 2×8 connector ports (i.e., sixteen connector ports in total), array 134 of 2×4 connector ports (i.e., eight connector ports in total), array 154 of 2×1 connector ports, array 144 of 2×1 connector ports, and power port 134 (e.g., which may be used to provide power to network component 114). For example, as illustrated, array 124 includes sixteen RJ45 connector ports, while network component 112 includes twenty RJ45 connector ports in total, and eight non-RJ45 connector ports. In a further example, array 134 may include small form factor pluggable (SFP) connector ports, gigabit interface converter (GBIC) connector ports, RJ11 connector ports, BNC connector ports, D-subminiature connector ports, spring terminals, screw terminals, any other suitable connector port or terminal, or any combination thereof.

Network component 115 includes array 125 of 2×6 connector ports (i.e., twelve connector ports in total), array 145 of 2×4 connector ports, and power port 135 (e.g., which may be used to provide power to network component 115). For example, as illustrated, array 125 includes sixteen RJ45 connector ports, and array 145 includes eight non-RJ45 connector ports. In a further example, array 134 may include small form factor pluggable (SFP) connector ports, gigabit interface converter (GBIC) connector ports, RJ11 connector ports, BNC connector ports, D-subminiature connector ports, spring terminals, screw terminals, any other suitable connector port or terminal, or any combination thereof. In a further example, power port 134 may include a barrel connector port, an IEC320 type connector port (e.g., IEC320 C13/C14/C5/C7), a NEMA type connector port (e.g., NEMA 5-15), any other suitable connector port or terminal, or any combination thereof.

Figure 2:
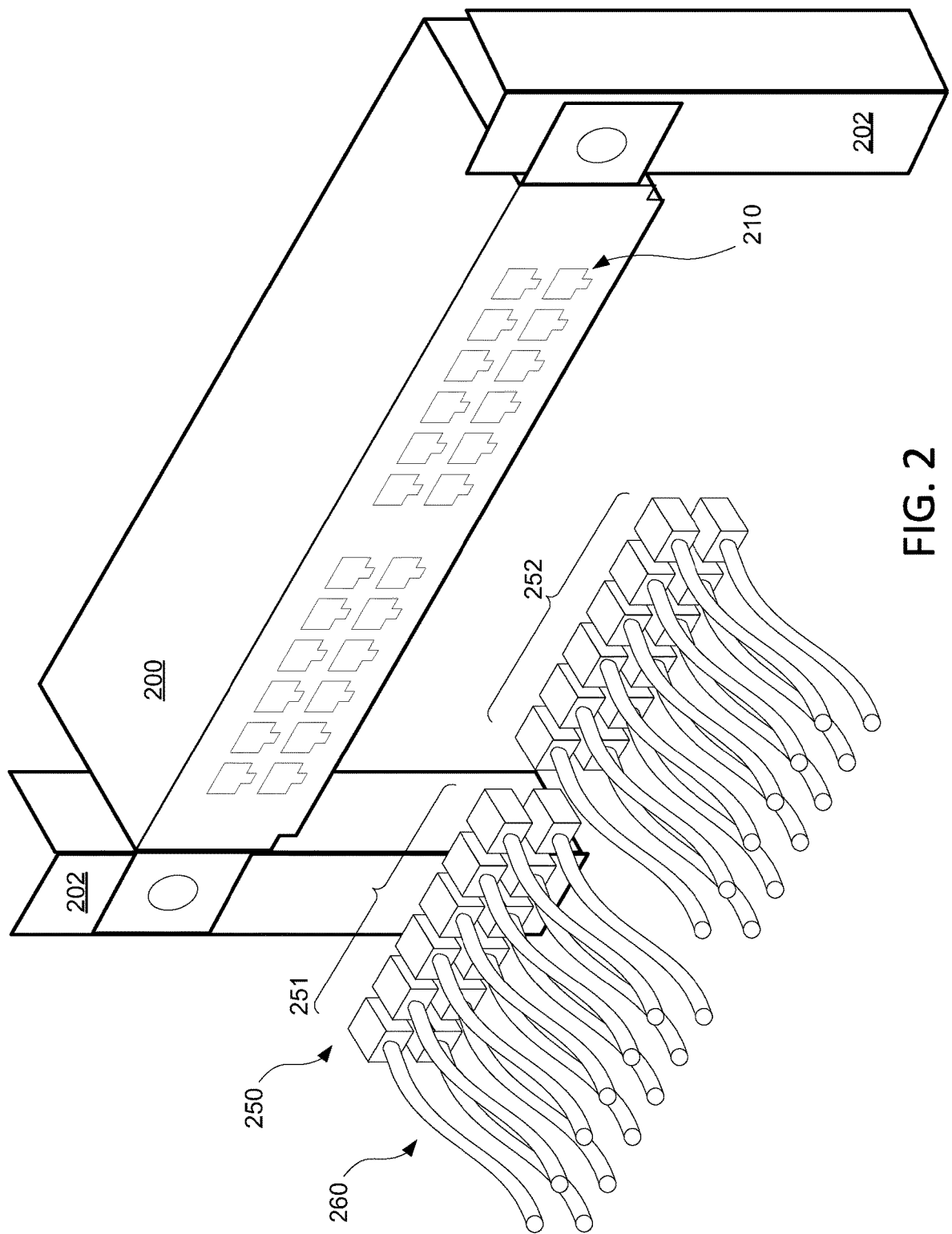
FIG. 2 shows a perspective view of an illustrative network component, and a plurality of corresponding connectors, in accordance with some embodiments of the present disclosure.

FIG. 2 shows a perspective view of illustrative network component 200, installed in rack 202, and corresponding connectors 250, in accordance with some embodiments of the present disclosure. For example, network component 200 may be similar to, or identical to, any of network components 110-115 of FIG. 1. Network component 200 includes array 210 of connector ports. As illustratively shown in FIG. 2, array 210 includes twenty-four connector ports, arranged into two 2×6 groups. For example, first set of connectors 251 is configured to interface to one 2×6 group, and second set of connectors 252 is configured to interface to the other 2×6 group.

In some embodiments, each connector port of array 210 is configured to interface to an RJ45 connector. For example, each connector port of array 210 may be configured to interface to a corresponding connector of connectors, via a connector tab. In some circumstances, each connector of connectors 250 includes a connector tab, and accordingly may be removed or installed individually.

As shown in FIG. 2, each connector port of array 210 may be addressed (e.g., a unique IP address), or otherwise referenced. Also, each connector of connectors 250 may be part of a respective cable, of cables 260, which is terminated at the other end (i.e., away from the connector of connectors 250) at an addressed, or otherwise referenced, remote connector port (not shown in FIG. 2). Accordingly, in some circumstances, it is desired to maintain the positions of connectors 250 relative to one another. For example, if one or more connectors of connectors 250 were plugged into a different connector port than intended, electrical damage, mechanical damage, or both, might occur. To illustrate, one or more connector ports of array 210 may include a VLAN connector port (e.g., predetermined port assignment), a power-over-ethernet (PoE) connector port, a predetermined subnet connector port, a non-ethernet-based pinout configuration that uses an RJ45 connector port for securement, any other suitable connector port having any other suitable pinout configuration, or any combination thereof.

In some embodiments, the present disclosure is directed to maintaining a relative arrangement of connectors (e.g., connectors 250), allowing removal from and installation to a network component (e.g., network component 200) with a relatively simple motion, or both.

Figure 3:
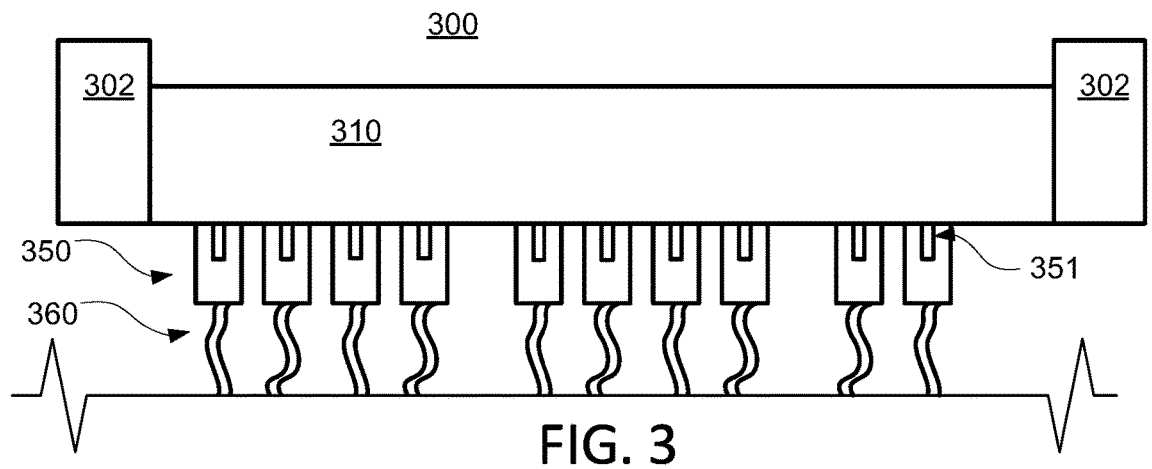
FIG. 3 shows a top view of an illustrative arrangement, in accordance with some embodiments of the present disclosure.

FIG. 3 shows a top view of illustrative arrangement 300, in accordance with some embodiments of the present disclosure. Arrangement 300 includes cables 360 having corresponding connectors 350 coupled to corresponding connector ports of network component 310. In some embodiments, connectors 350 include corresponding connector tabs 351 (e.g., each connector includes a connector tab). For example, in some embodiments, connectors 350 are RJ45 connectors having corresponding connector spring tabs for securing to a connector port (e.g., a connector port of network component 310). Connector tabs 351 are configured to engage with (e.g., latch to) the corresponding connector port, preventing disconnection and aiding in maintaining electrical contact between pins of the connector and corresponding pins of the connector port.

Network component 310 may be similar to, for example, any of network components 110-115 of FIG. 1, or network component 200 of FIG. 2. Rack 302 may be similar to, for example, rack 102 of FIG. 1, or rack 202 of FIG. 2.

Figure 4:
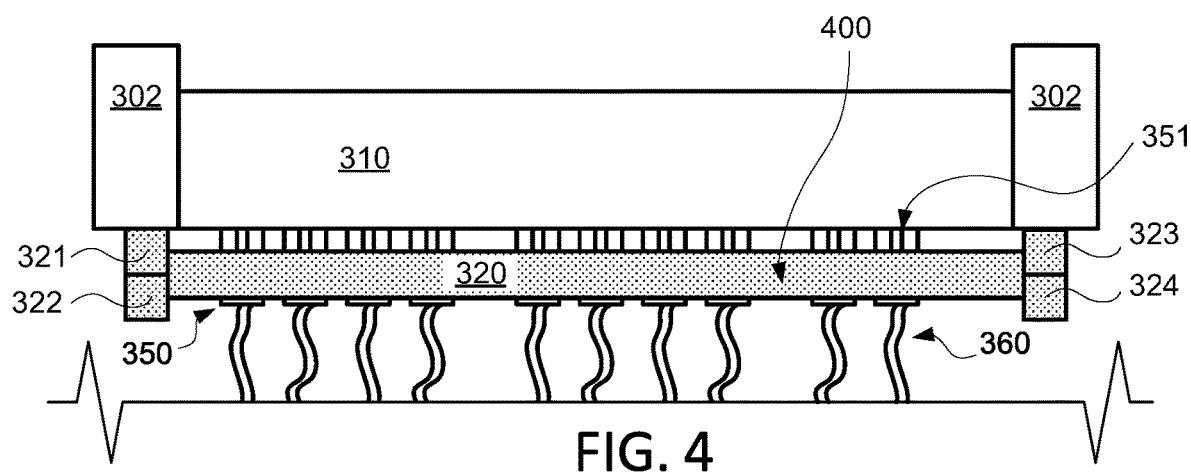
FIG. 4 shows a top view of a system for managing the arrangement of FIG. 3, in accordance with some embodiments of the present disclosure.

FIG. 4 shows a top view of system 400 for managing arrangement 300 of FIG. 3, in accordance with some embodiments of the present disclosure. In some embodiments, system 400 is installed before plugging connectors 350 into network component 310. System 400 includes member 320, a first latch (e.g., including latching components 321 and 322), and a second latch (e.g., including latching components 323 and 324).

Member 320 may include one or more components configured to provide rigidity, provide alignment, and engage connector tabs 351 to release connector tabs 351 from the corresponding connector ports of network component 310. Accordingly, when system 400 is installed, each of connector tabs 351 need not be individually released because member 320 engages connector tabs 351. For example, connectors 350 may each be an RJ45 connector, and member 320, when system 400 is in place, may push down each of connector tabs 351 thereby releasing them from the corresponding connector ports. When system 400 is installed, member 320 securely engages with connectors 350, so that connectors 350 do not move appreciably relative to member 320. For example, when system 400 is installed, connectors 350 do not move relative to member 320 sufficiently to break the electrical connection with the corresponding connector port.

The first and second latches are configured to secure and release member 320 from rack 302 (e.g., by a user). When system 400 is installed, latching components 321 and 323 are rigidly affixed to rack 302. When system 400 is installed, latching components 322 and 324 are rigidly affixed to member 320. Accordingly, when system 400 is installed, and the first latch and second latch are secured, member 320 cannot move appreciably relative to network component 310. Further, connectors 350 are secured to corresponding connector ports of network component 310 via member 320 (e.g., member 320 having released connector tabs 351).

In some embodiments, latching components 321 and 323 may be included as part of rack 302 (e.g., be integrated into rack 302, or include an existing feature of rack 302). In some embodiments, latching components 322 and 324 may be included as part of member 320 (e.g., integrated into member 320, or included an existing feature of member 320).

Figure 5:
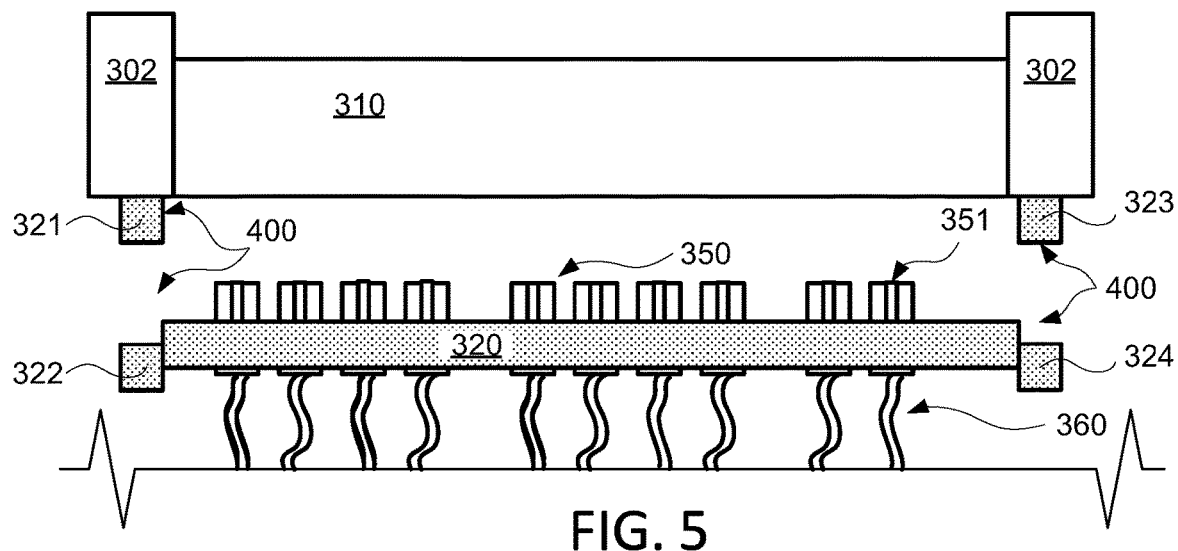
FIG. 5 shows a top view of the system of FIG. 4, decoupled from the component, in accordance with some embodiments of the present disclosure.

FIG. 5 shows a top view of system 400 of FIG. 4, decoupled from component 310, in accordance with some embodiments of the present disclosure. When removed, system 400 is configured to maintain the relative positions of connectors 350 as when connectors 350 are plugged into network component 310. The first and second latch may be released, such that latching components 322 and 324 may be separated from respective latching components 321 and 323. The disconnection of connectors 350 from network component 310 is accomplished using system 400 by releasing the first and second latches, rather than disengaging each of connector tabs 351. Accordingly, in some circumstances, system 400 allows connectors 350 to be disconnected without keeping track of the individual positions (e.g., addresses) of each connector of connectors 350. For example, system 400 may be used to remove connectors 350 while network component 310 is being replaced. After replacement, connectors 350 may be re-plugged into the same connector port from which they were removed (e.g., because connectors 350 are maintained in position by system 400).

In some embodiments, system 400 may be installed onto connectors 350 before connectors 350 are plugged into network component 310. For example, a rigid assembly of connectors 350 and system 400 may be assembled. The rigid assembly may be interfaced to network component 310 (e.g., connectors 350 are inserted into corresponding connector ports of network component 310 to make electrical contact), and the latches are secured (e.g., latching components 321 and 323 are secured to rack 302).

Figure 6:
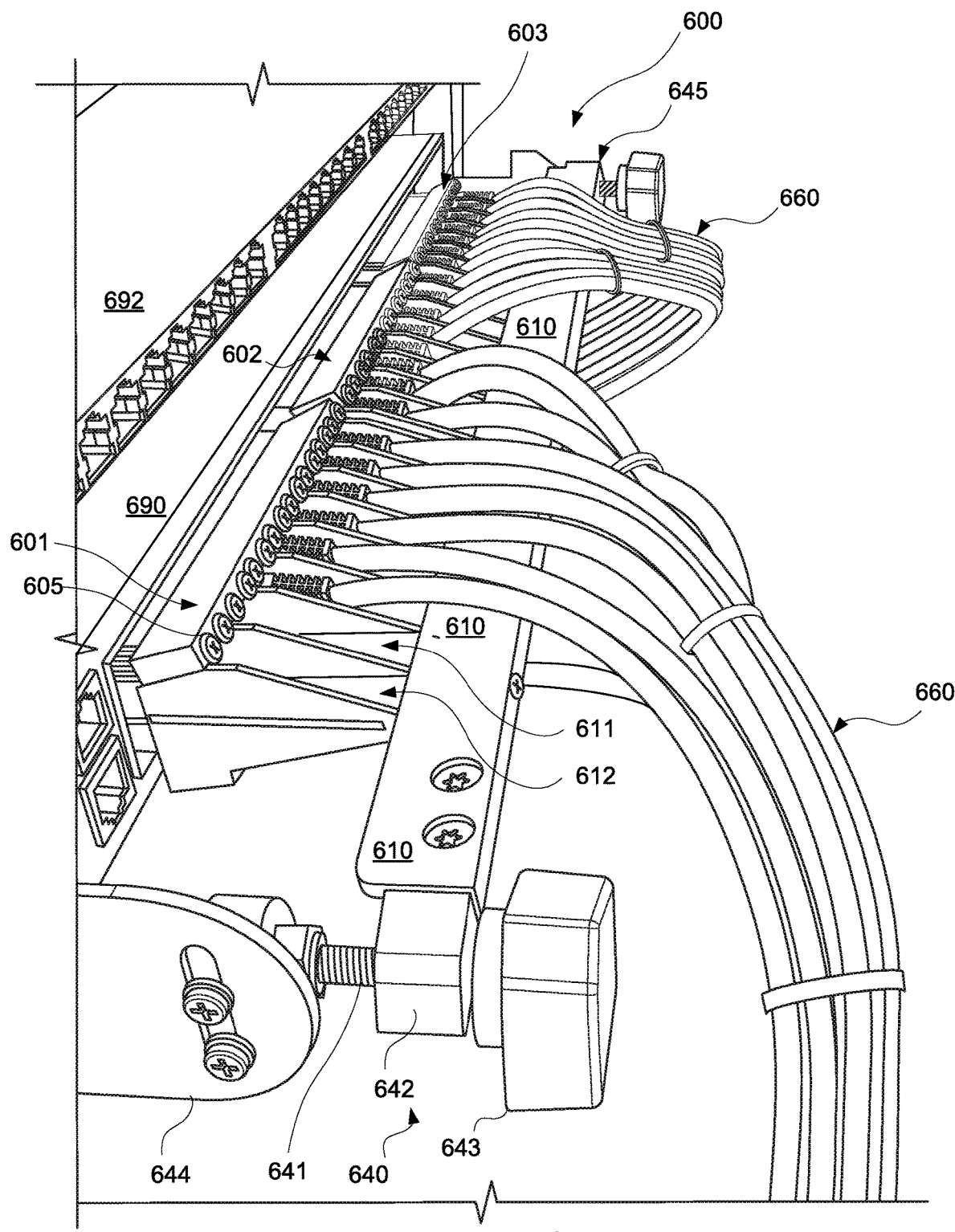
FIG. 6 shows a perspective view of a system for managing a plurality of corresponding connectors, in accordance with some embodiments of the present disclosure.
Figure 7:
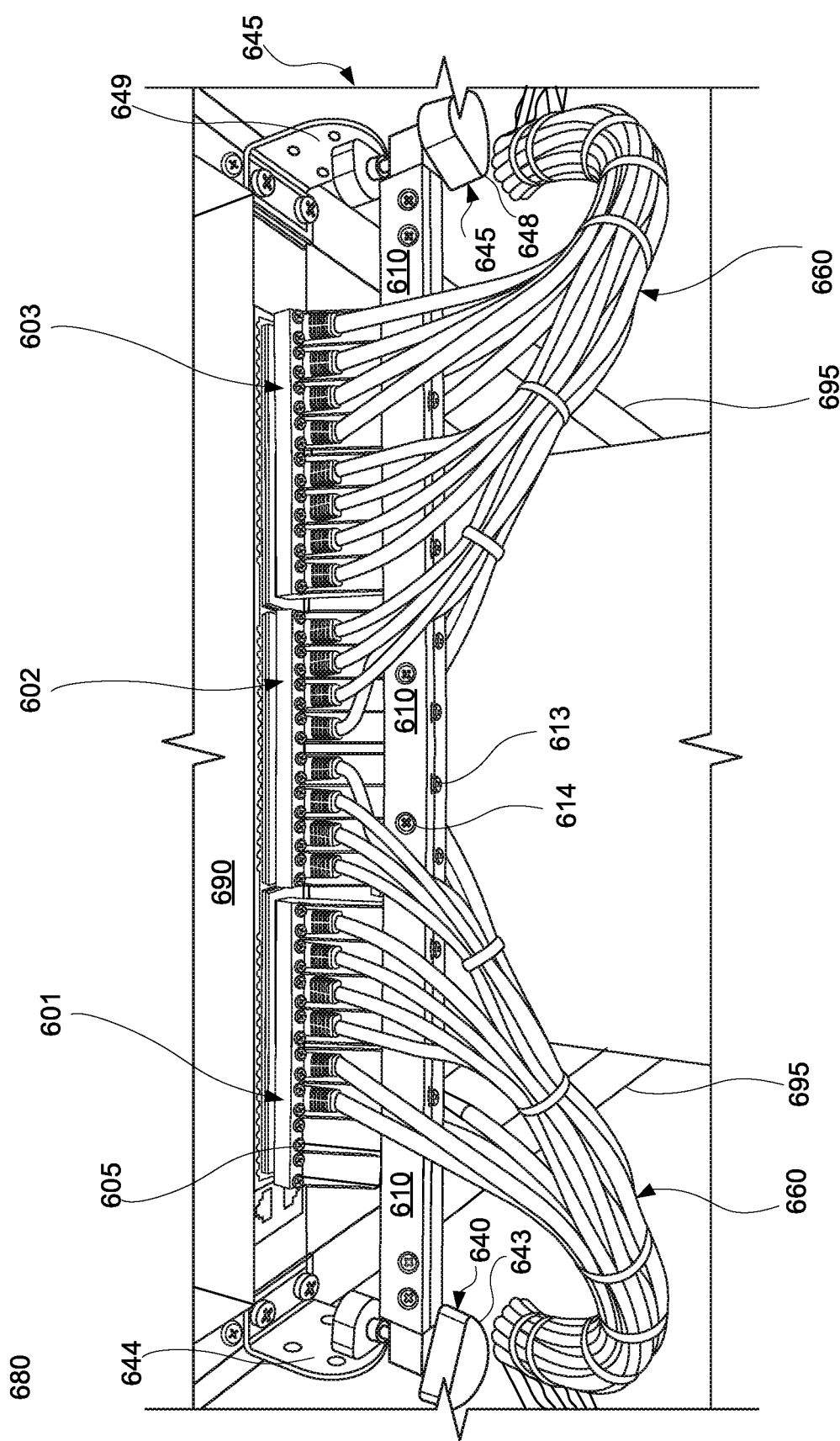
FIG. 7 shows an auxiliary view (near-top view) of the system of FIG. 6, in accordance with some embodiments of the present disclosure.
Figure 8:
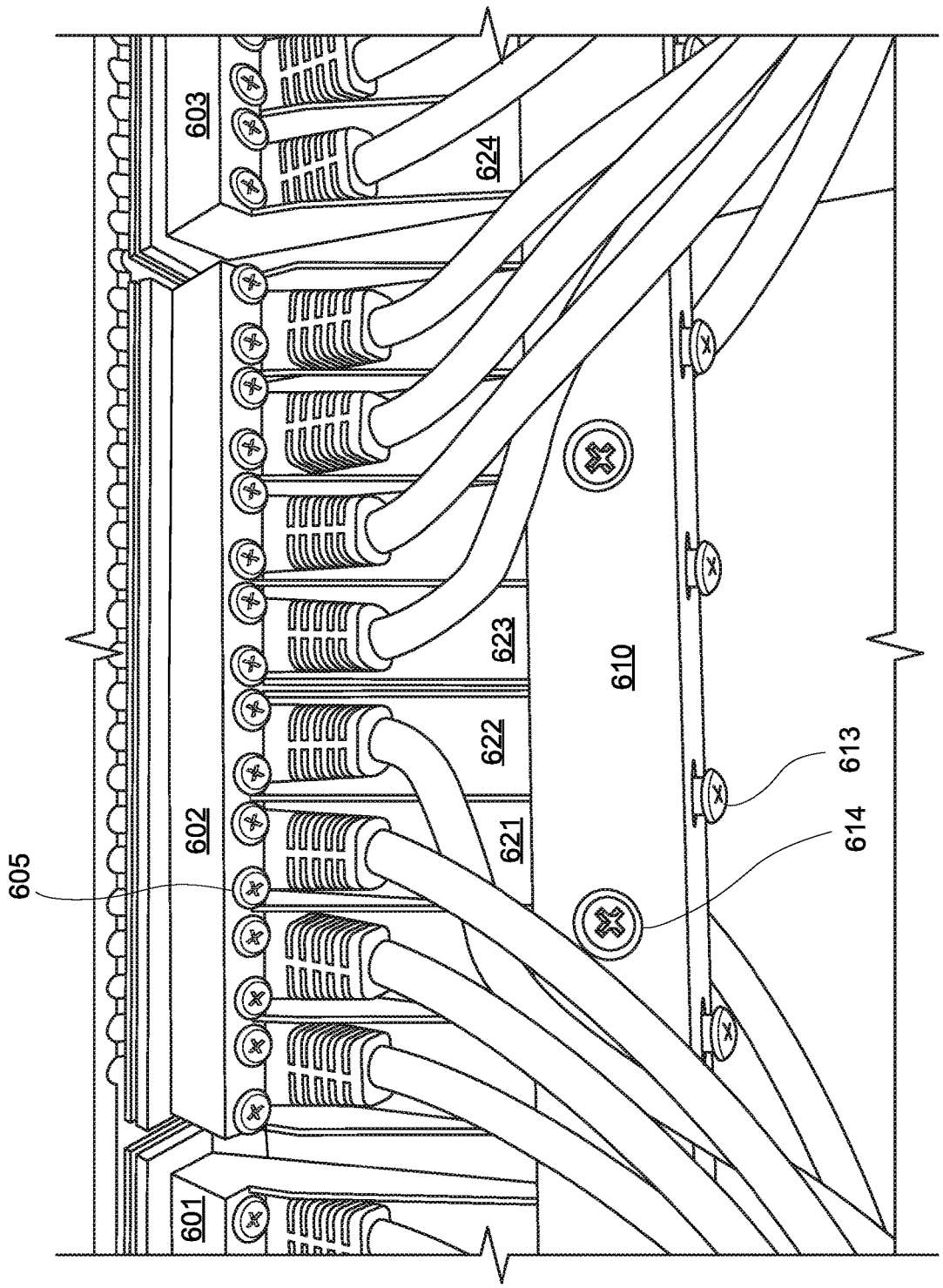
FIG. 8 shows an enlarged view of a portion of FIG. 7, in accordance with some embodiments of the present disclosure.

FIG. 6 shows a perspective view of system 600 for managing a plurality of corresponding connectors, in accordance with some embodiments of the present disclosure. FIG. 7 shows an auxiliary view (e.g., near-top view) of system 600 of FIG. 6, in accordance with some embodiments of the present disclosure. FIG. 8 shows an enlarged view of a portion of FIG. 7, in accordance with some embodiments of the present disclosure. As illustrated in FIG. 6, system 600 includes connector blocks 601, 602, and 603, crossbar 610, and latching mechanisms 640 and 645. System 600 is installed on network component 690, which includes a plurality of connector ports, arranged in three 2×8 arrays, and one 2×1 array (i.e., fifty connector ports in total).

Network component 692, to which system 600 is not installed, includes three 1×8 arrays (i.e., twenty-four connector ports in total). A similar system to system 600 may be installed on network component 692, for example, in accordance with some embodiments of the present disclosure. Network components 690 and 692 are installed in standard rack 695 (not shown in FIG. 6 but shown in FIGS. 7-8).

Each of connector blocks 601, 602, and 603 include sixteen connector bays arranged to correspond to the respective 2×8 array of connector ports of network component 690. Each connector bay is configured to accommodate a connector. In some embodiments, each connector bay has one or more fasteners 605, which may be used to secure the corresponding connector in the connector bay. Illustrative connector bays 611 and 612 are shown in FIG. 6, and illustrative connector bays 621, 622, 623, and 624 are shown in FIG. 8).

Cables 660 each have a respective connector, as shown in FIG. 6. Each respective connector corresponds to a connector bay of connector blocks 601, 602, and 603. However, connector bays 611 and 612 are empty, with no connector installed.

Latching mechanism 640 includes latching component 641, latching component 642 and latching component 643. As illustrated, latching component 641 includes a threaded stud onto which nut 643 screws. Latching component 641 is secured to frame 644. Latching component 642 includes a through-hole feature integral to crossbar 610. As shown in FIG. 7, frames 644 and 649 are secured to rack 695 (e.g., via fasteners). When nuts 643 and 648 are tightened until secured, crossbar 610 is pushed towards network component 690, thus seating the connectors of cables 660 into corresponding connector ports. Further, when nuts 643 and 648 are loosened until released, crossbar 610 may be moved away from network component 690 (e.g., disconnecting connectors of cables 660 from corresponding connector ports).

Fasteners 614 are configured to secure members of crossbar 610. Fasteners 613 are configured to secure connector blocks 601, 602, and 603 to crossbar 610. In some embodiments, connector blocks 601, 602, and 603 need not be secured using fasteners. For example, connector blocks may be latched, clamped, inserted into, or otherwise affixed to, crossbar 610 using any suitable technique.

Figure 9:
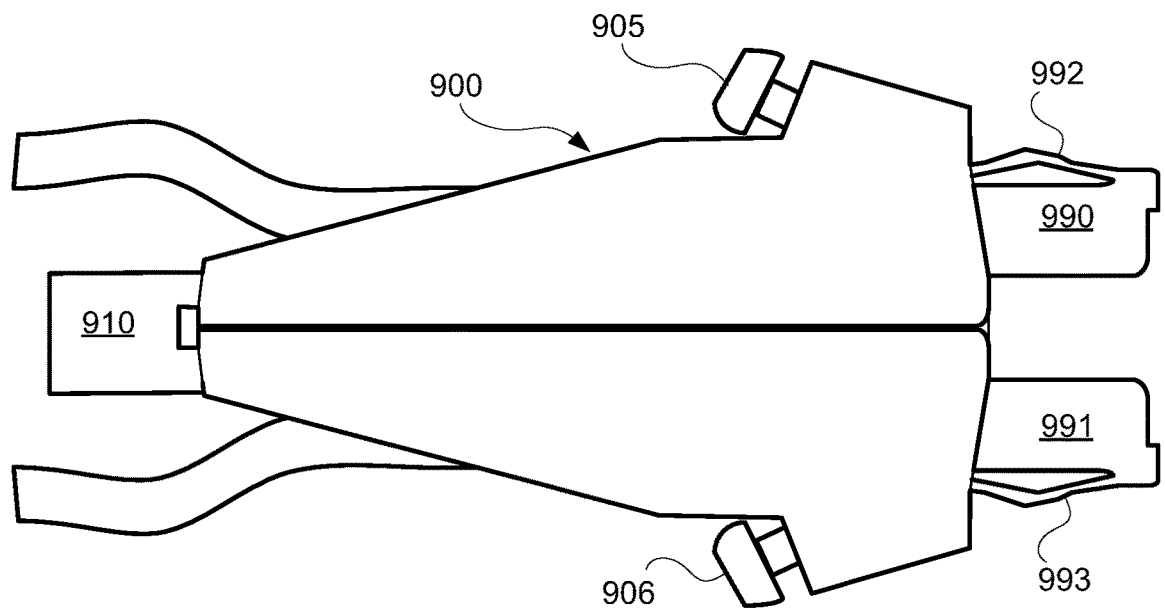
FIG. 9 shows a side view of an illustrative connector block having two rows, in accordance with some embodiments of the present disclosure.
Figure 10:
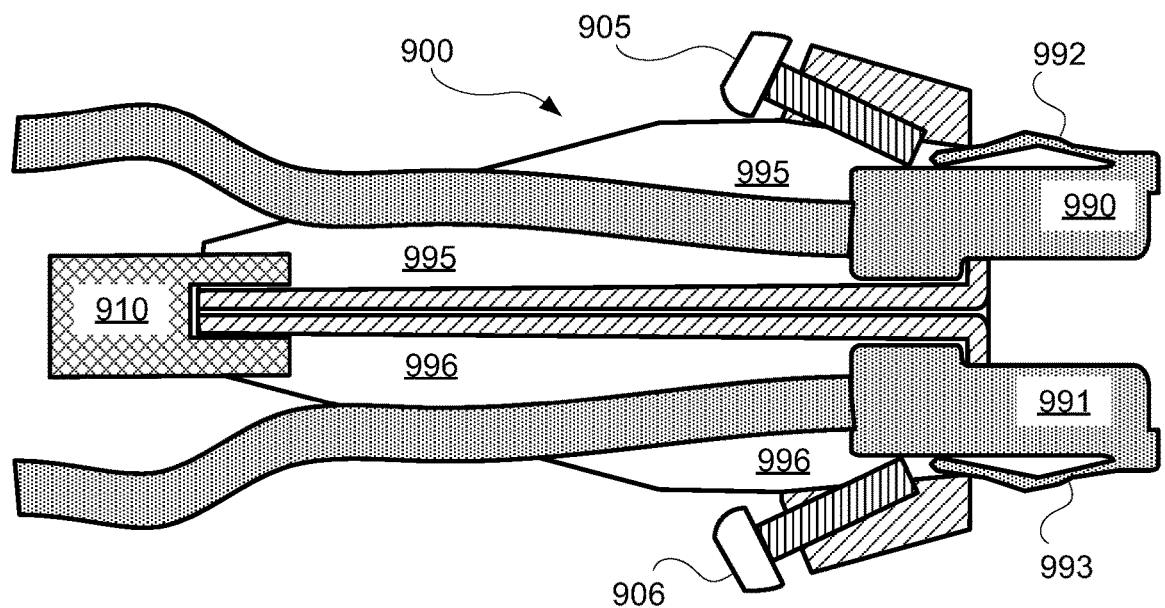
FIG. 10 shows a cross-sectional view of the illustrative connector block of FIG. 9, in accordance with some embodiments of the present disclosure.

FIG. 9 shows a side view of illustrative connector block 900 having two rows, in accordance with some embodiments of the present disclosure. FIG. 10 shows a cross-sectional view of illustrative connector block 900 of FIG. 9, in accordance with some embodiments of the present disclosure. Connector block 900 is configured, for example, to secure connectors 990 and 991. For example, connectors 990 and 991 may be secured in respective connector bays 995 and 996 by respective fasteners 905 and 906. Connector block 900 is coupled to crossbar 910, as shown in FIGS. 9-10. For example, the assembly of crossbar 910, connector block 900, along with connectors 990 and 991, may be interfaced to a network component having connector ports.

In some embodiments, fasteners 905 and 906 are used to secure and release connectors 990 and 991 to and from connection block 900. For example, fasteners 905 and 906 may be tightened to secure connectors 990 and 991 to connector block 900, and fasteners 905 and 906 may be loosened to release connectors 990 and 991 from connector block 900. Connectors 990 and 991 also include corresponding connector tabs 992 and 993.

Although not shown in FIGS. 9-10, in some embodiments, connector block 900 may include two separate connector blocks (e.g., an upper connector block and a lower connector block), each rigidly coupled to crossbar 910.

Figure 11:
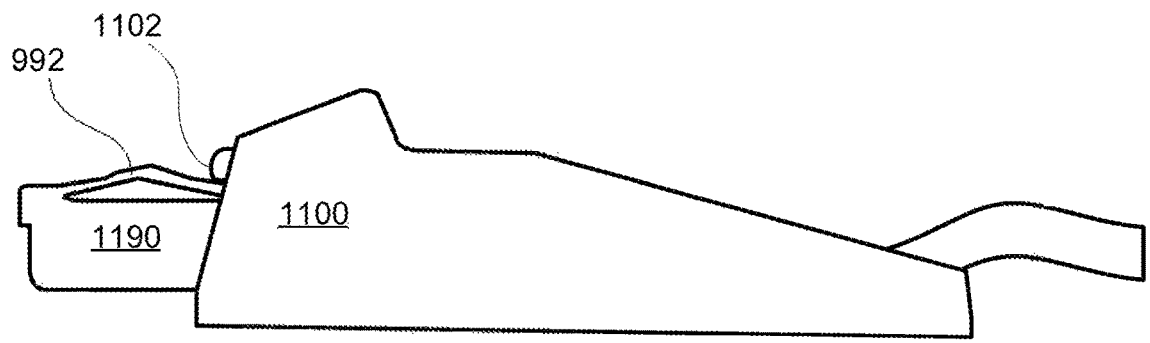
FIG. 11 shows a side view of an illustrative connector block having a single row, in accordance with some embodiments of the present disclosure.
Figure 12:
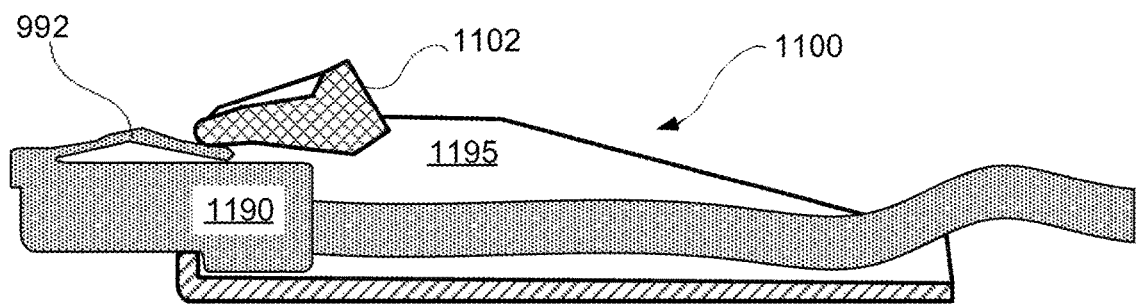
FIG. 12 shows a cross-sectional view of the illustrative connector block of FIG. 11, in accordance with some embodiments of the present disclosure.
Figure 13:
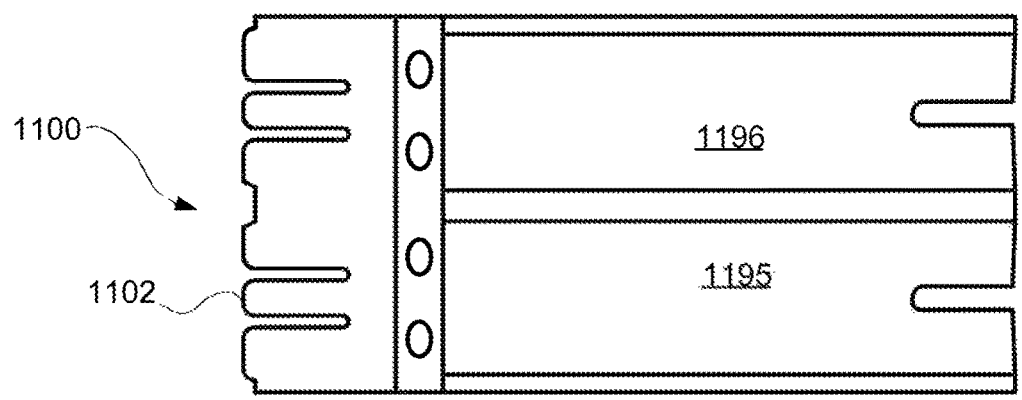
FIG. 13 shows a top view of the illustrative connector block of FIG. 11, in accordance with some embodiments of the present disclosure.

FIG. 11 shows a side view of illustrative connector block 1100 having a single row, in accordance with some embodiments of the present disclosure. FIG. 12 shows a cross-sectional view of illustrative connector block 1100 of FIG. 11, in accordance with some embodiments of the present disclosure. FIG. 13 shows a top view of illustrative connector block 1100 of FIG. 11, in accordance with some embodiments of the present disclosure. Connector block 1100 includes connector bays 1195 and 1196, each configured to accommodate a corresponding connector. Spring tab 1102 is configured to apply a force on connector tab 992 of connector 1190, thereby securing connector 1190 in connector bay 1195, and persistently preventing connector tab 992 from ever latching to a corresponding connector port.

Figure 14:
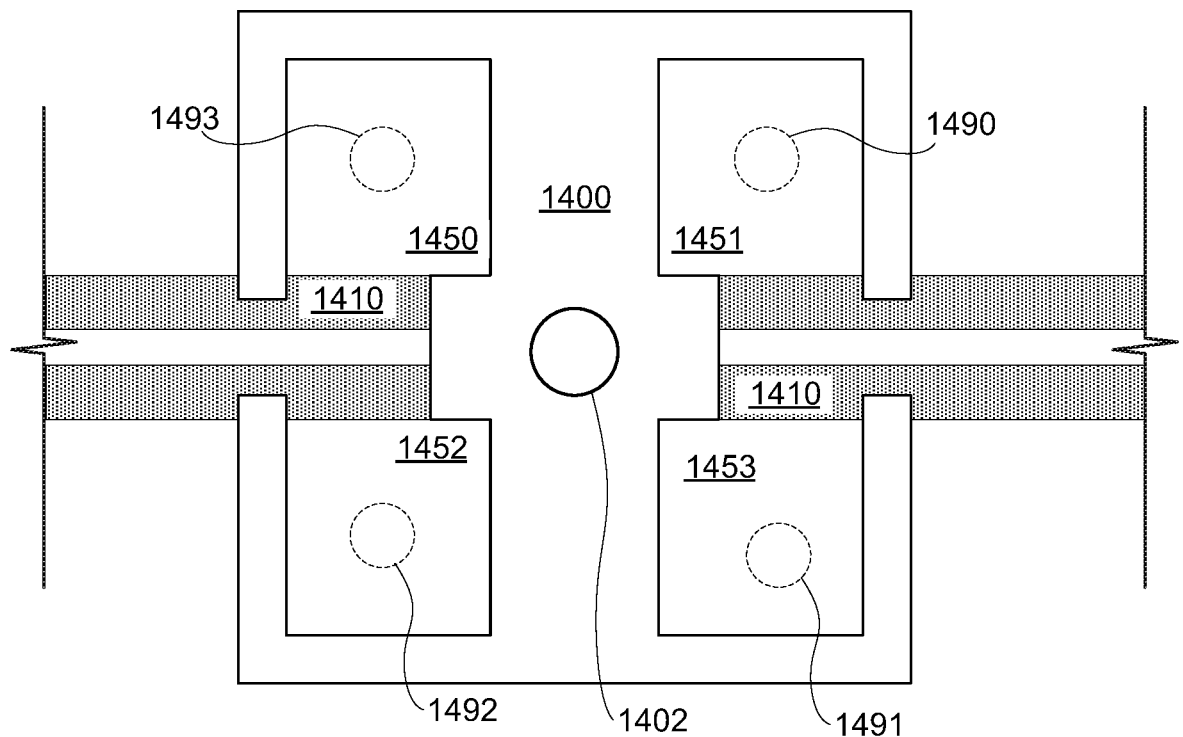
FIG. 14 shows a front view of an illustrative cable block, in accordance with some embodiments of the present disclosure.

FIG. 14 shows a front view of illustrative cable block 1400, in accordance with some embodiments of the present disclosure. Cable block 1400 interfaces to crossbar 1410. As shown in FIG. 14, crossbar 14 includes two parallel members, although in some embodiments, crossbar 1410 may include a single member.

Cable block 1400 includes openings 1490, 1491, 1492, and 1493, which are configured to accommodate one or more cables, and maintain an array position of each cable relative to the others. An array position, as used herein, refers to a position in a grid or array, rather than a spatial position. For example, an array position may be 1×3 (i.e., first row, third column), which need not define a spatial position.

Figure 15:
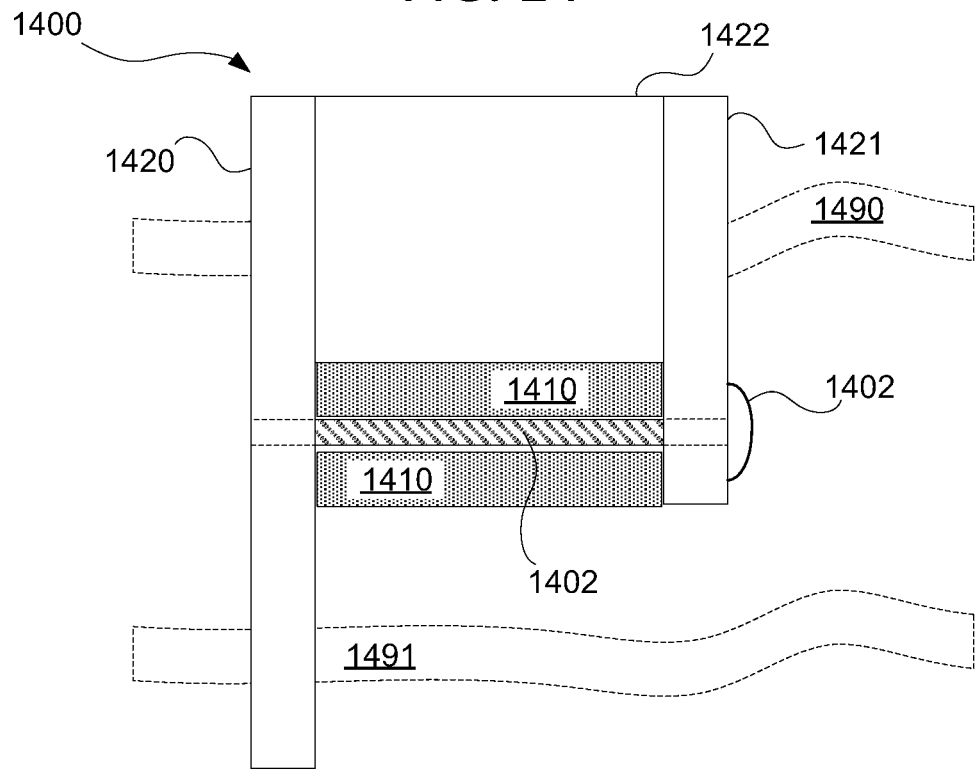
FIG. 15 shows a side, cross-sectional view of the illustrative cable block of FIG. 14, in accordance with some embodiments of the present disclosure.

FIG. 15 shows a side, cross-sectional view of illustrative cable block 1400 of FIG. 14, in accordance with some embodiments of the present disclosure. Cable block 1400, as illustratively shown, includes front block 1420 and rear block 1421, coupled to crossbar 1410 by fastener 1402.

Figure 16:
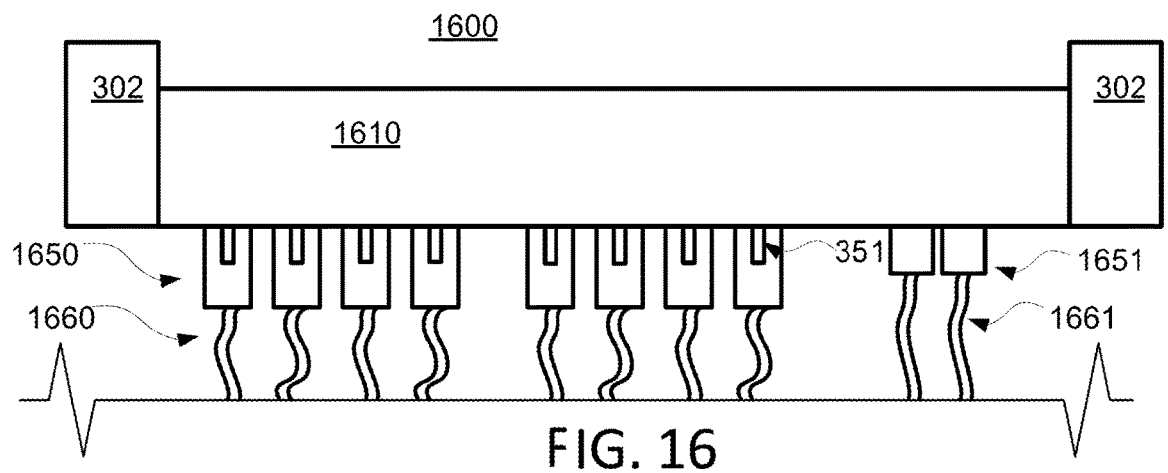
FIG. 16 shows a top view of an illustrative arrangement, having different types of connectors, in accordance with some embodiments of the present disclosure.

FIG. 16 shows a top view of illustrative arrangement 1600, having different types of connectors, in accordance with some embodiments of the present disclosure. Arrangement 1600 is similar to arrangement 300 of FIG. 3, except that with regard to arrangement 1600, rack 302 includes network component 1610, which has two types of connector ports. For example, network component 1610 may have first connector ports configured to couple to connectors 1650 (e.g., with corresponding cables 1660), and second connector ports configured to couple to connectors 1651 (e.g., with corresponding cables 1661), which differ from connectors 1650 (e.g., either in shape, size, array configuration, or a combination thereof). Network component 1610 may be similar to, for example, any of network components 110-115 of FIG. 1, or network component 200 of FIG. 2.

Figure 17:
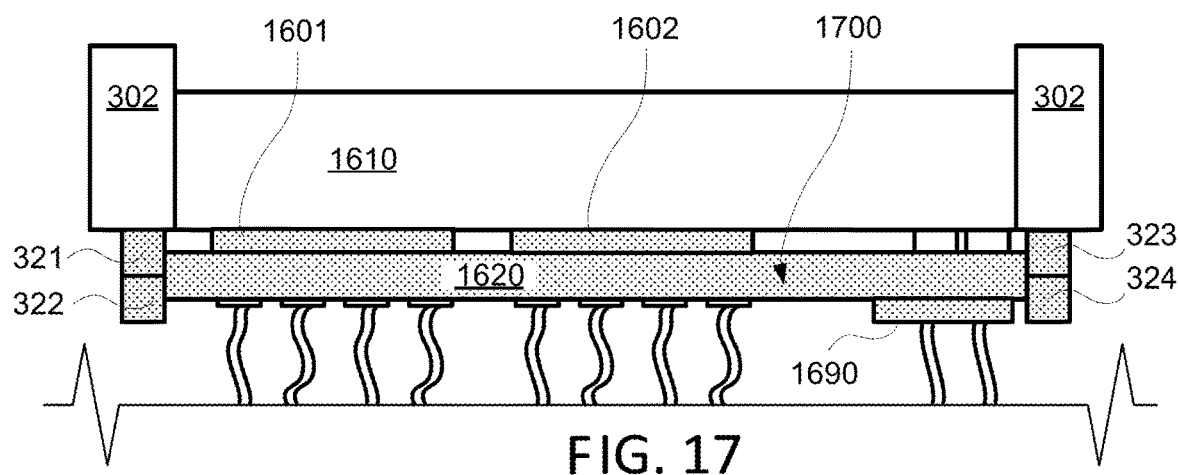
FIG. 17 shows a top view of a system for managing the arrangement of FIG. 16, in accordance with some embodiments of the present disclosure.

FIG. 17 shows a top view of system 1700 for managing the arrangement of FIG. 16, in accordance with some embodiments of the present disclosure. System 1700 includes member 1620, connector blocks 1601 and 1602, cable block 1690, a first latch (e.g., including latching components 321 and 322), and a second latch (e.g., including latching components 323 and 324). The first latch and second latch are more fully described in the context of FIGS. 3-5.

When system 1700 is installed, connector blocks 1601 and 1602 securely engage with connectors 1650, so that connectors 1650 do not move appreciably relative to member 1620. For example, when system 1700 is installed, connectors 1650 do not move relative to member 1620 sufficiently to break the electrical connection with the corresponding connector port.

The first and second latches are configured to secure and release member 1620 from rack 302 (e.g., by a user). When system 1700 is installed, latching components 321 and 323 are rigidly affixed to rack 302. When system 1700 is installed, latching components 322 and 324 are rigidly affixed to member 1620. Accordingly, when system 1700 is installed, and the first latch and second latch are secured, member 1620 cannot move appreciably relative to network component 1610. Further, connectors 1650 are secured to corresponding connector ports of network component 1610 via connector blocks 1601 and 1602, member 1620, and two latching mechanisms. When system 1700 is installed, cable block 1690 maintains the array position of cables 1661, and thus connectors 1651.

In some embodiments, latching components 321 and 323 may be included as part of rack 302 (e.g., be integrated into rack 302, or include an existing feature of rack 302). In some embodiments, latching components 322 and 324 may be included as part of member 1620 (e.g., integrated into member 1620, or include an existing feature of member 1620).

Figure 18:
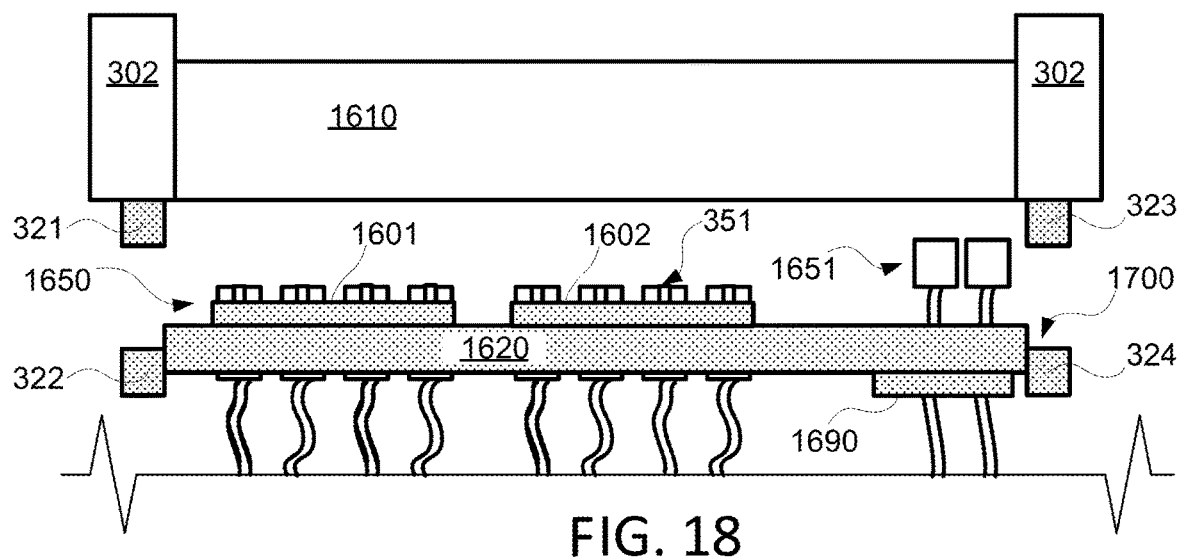
FIG. 18 shows a top view of the system of FIG. 17, decoupled from the component, in accordance with some embodiments of the present disclosure.

FIG. 18 shows a top view of system 1700 of FIG. 17, decoupled from component 1610, in accordance with some embodiments of the present disclosure. When removed, system 1700 is configured to maintain the relative positions of connectors 1650 as when connectors 1650 are plugged into network component 1610. Further, when removed, system 1700 is configured to maintain the array positions of connectors 1651 as when connectors 1651 are plugged into network component 1610. In some embodiments, cables 1661 may be free to move within their array positions, as shown in FIG. 18.

The first and second latch may be released, such that latching components 322 and 324 may be separated from respective latching components 321 and 323. The disconnection of connectors 1650 from network component 1610 is accomplished using system 1700 by releasing the first and second latches, rather than disengaging each of the connector tabs of connectors 1650. Connectors 1651 may be removed by hand, separate from connectors 1650, wherein cable block 1690 maintains their array position. For example, in some embodiments, system 1700 may be decoupled from network component 1610, while connectors 1651 remain connected to connector ports of network component 1610. In a further example, in some embodiments, system 1700 may be decoupled from network component 1610, and connectors 1651 may be separately (e.g., before or after) disconnected from network component 1610.

Although not shown, a third connector block may be included in system 1700, configured to release connector tabs of connectors 1651 such that when the latching mechanisms are released, connectors 1651 may be removed from network component 1610. For example, connectors 1651 may include GBIC or SFP type connectors, and a connector block may engage connector tabs of connectors 1651 such that they do not require manual release when system 1700 is removed.

In some embodiments, a system for managing a plurality of connectors and corresponding cables includes any suitable number of connector blocks, cable blocks, and latching mechanisms, in accordance with the present disclosure. For example, a system may include one or more connector blocks, one or more cable blocks, or a combination thereof. A system may optionally include, for example, strain reliefs (e.g., cord grips), labels, any other suitable components, or any combination thereof. In some embodiments, a system for managing a plurality of connectors and corresponding cables includes any suitable type of connector blocks (e.g., configured to engage with any suitable type of connectors), cable blocks, and latching mechanisms, in accordance with the present disclosure.

Figure 19:
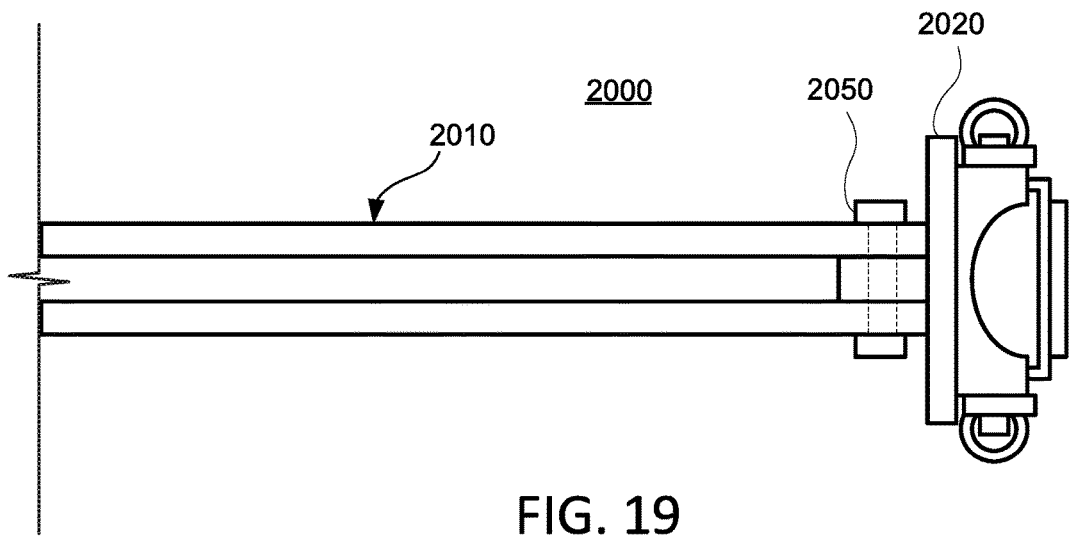
FIG. 19 shows a front view of a portion of an illustrative crossbar and latching mechanism, in accordance with some embodiments of the present disclosure.
Figure 20:
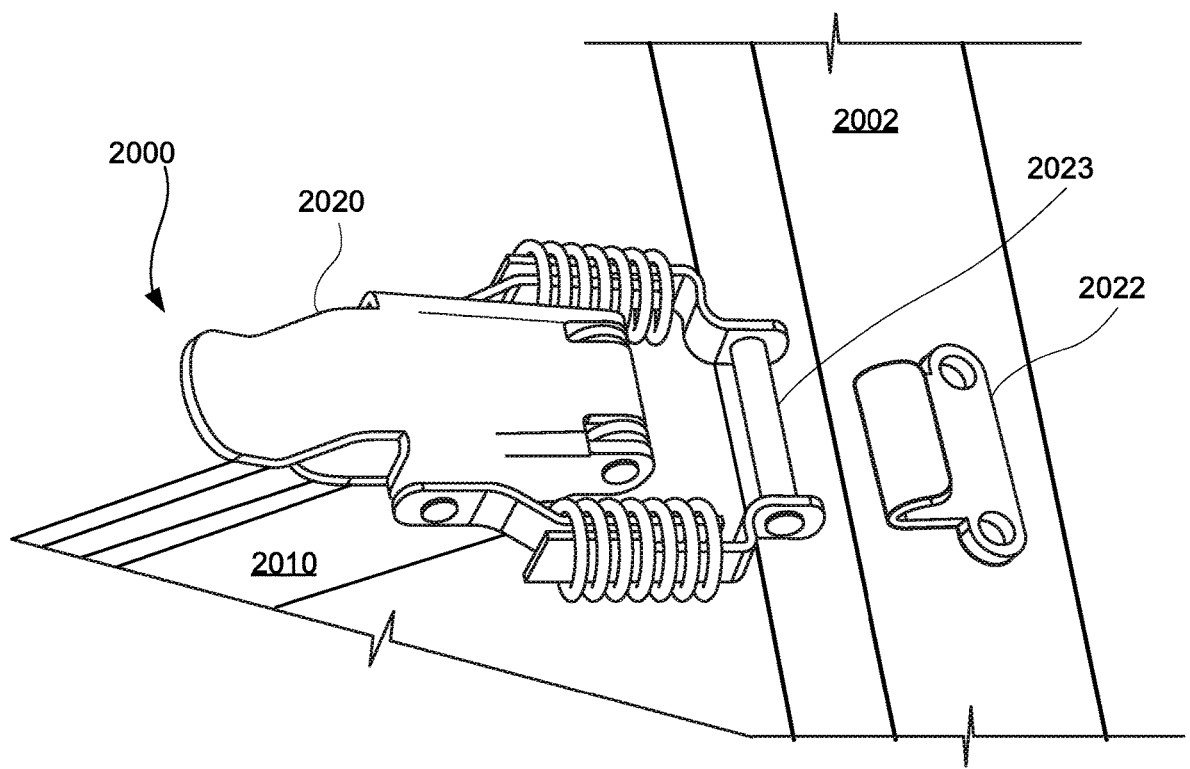
FIG. 20 shows a perspective view of a portion of the illustrative crossbar and latching mechanism of FIG. 19, and a rack, in accordance with some embodiments of the present disclosure.

FIG. 19 shows a front view of a portion of illustrative crossbar 2010 and latching mechanism 2020, in accordance with some embodiments of the present disclosure. FIG. 20 shows a perspective view of a portion of illustrative crossbar 2010 and latching mechanism 2020 of FIG. 19, and rack 2002, in accordance with some embodiments of the present disclosure. Crossbar 2010 includes two parallel members, as shown in FIGS. 19-20, but may include any suitable construction (e.g., a single member, or more than two members). Latching mechanism 2020 includes a spring-loaded clasp, which engages with latching component 2022 (e.g., a hook) using pin 2023 to secure crossbar 2010 to rack 2002. In some embodiments, spring-loading is used to impart a force on crossbar 2010, and accordingly any connectors coupled to crossbar 2010, to aid in maintaining electrical connections of the connectors. For example, the force from spring-loading may be sufficient to overcome the spring force of spring tabs, and electrical connection terminals of a plurality of connectors coupled to crossbar 2010 (e.g., via suitable connector blocks). In some embodiments, another latching mechanism similar to latching mechanism 2020 may be included at the opposite end of crossbar 2010, to apply a similar force. For example, spring-loaded latches may be included at lateral ends of crossbar 2010 to impart an even force across a plurality of connectors into corresponding connector ports of a network component.

FIG. 21 shows a top view of illustrative latching component 2100, in accordance with some embodiments of the present disclosure. FIG. 22 shows a side view of illustrative latching component 2100 of FIG. 21, in accordance with some embodiments of the present disclosure. FIG. 23 shows a front view of illustrative latching component 2100 of FIG. 21, in accordance with some embodiments of the present disclosure. Latching component 2100 is configured to be coupled to a standard rack via fasteners, for example. Plate 2105 of latching component 2100 is configured to be coupled to a rack, while plate 2106 is configured to mount hook 2107 (e.g., via pin 2108). In some embodiments, plates 2105 and 2106 are a single part, made from a sheet of metal and stamped to include a 90° bend. Plate 2106 includes holes 2110 and 2108, which allow for mounting hook 2107 at two different locations (e.g., based on a network component layout). Plate 2105 includes recesses, as shown, for mounting to a rack. In some embodiments, plate 2105 may include holes or other suitable features for mounting to a rack.

FIG. 24 shows a side view of illustrative latching component 2100 of FIG. 21, and latching mechanism 2150, in accordance with some embodiments of the present disclosure. Pin 2157 of latching mechanism 2150 is configured to engage with hook 2107, secured by springs 2160.

The latching components of FIGS. 19-24 may be used in accordance with any of the arrangements of FIGS. 3-5 and FIGS. 16-18, for example. Any suitable latching component, securement, fastener, mechanism, or other hardware, included in any suitable arrangement, may be used to secure a crossbar or member to a mounting reference, in accordance with the present disclosure.

Figure 25:
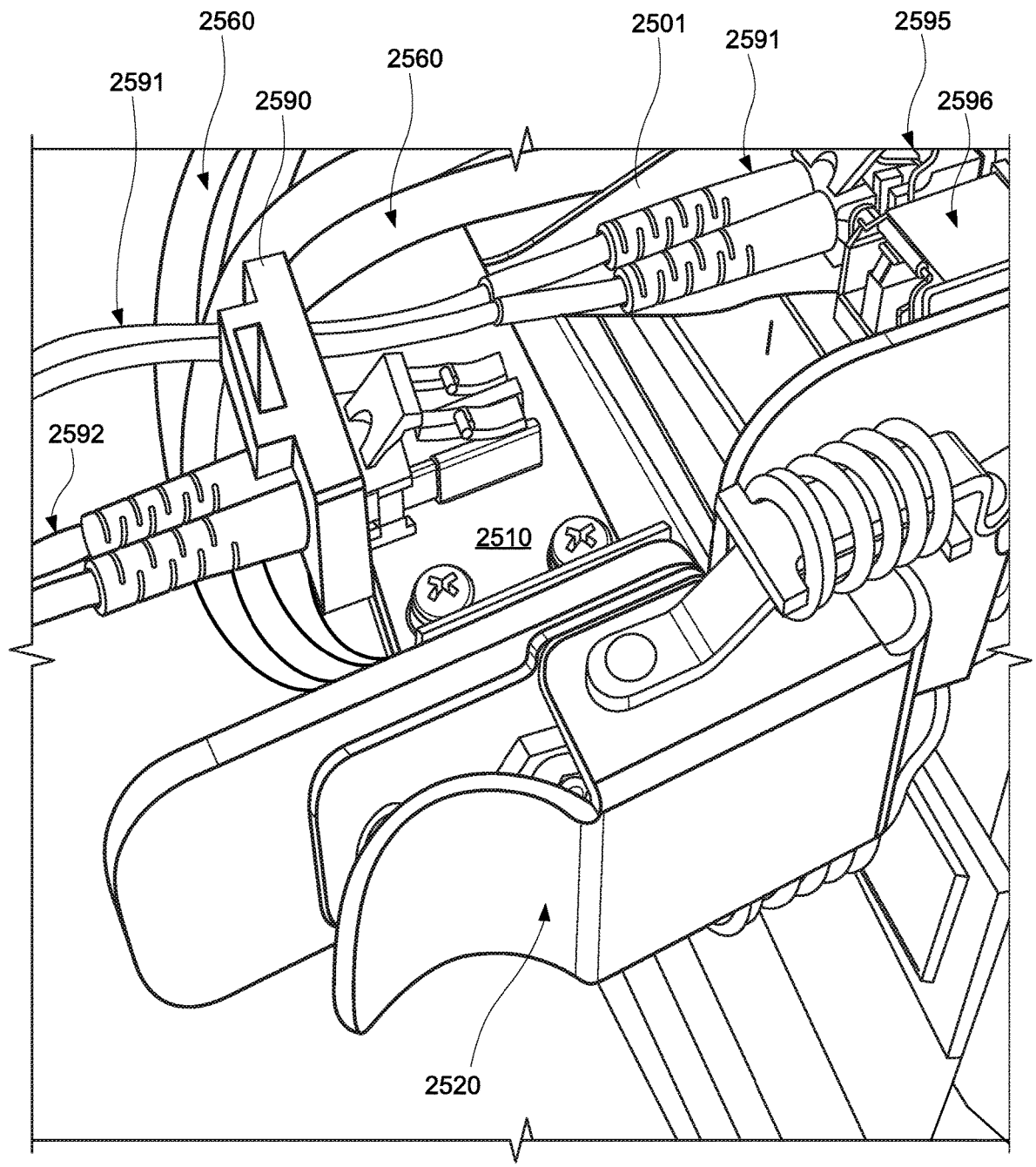
FIG. 25 shows a perspective view of a system including a cable block and latching mechanism, in a latched state, in accordance with some embodiments of the present disclosure.

FIG. 25 shows a perspective view of a system including cable block 2590 and latching mechanism 2520, in a latched state, in accordance with some embodiments of the present disclosure. A network component, to which the system is installed, includes optical fiber connector ports 2595 and 2596. The network component is mounted in a rack. Connector block 2501 includes connector bays configured to accommodate connectors of cables 2560. Cables 2560 each have a respective connector (e.g., a RJ45 connector). Latching mechanism 2520 includes latching components (e.g., similar to components illustrated in FIGS. 19-24) configured to secure and release crossbar 2510 to the rack.

The network component includes connector ports 2595 and 2596, configured to accommodate connectors of cables 2591 and 2592 respectively (e.g., fiber optic cables having optical connectors). Cable block 2590, which is mounted to crossbar 2510, is configured to allow cables 2591 and 2592 to pass through to the network component. For example, in some embodiments, cable block 2590 may include through holes that are just larger than cables 2591 and 2592, allowing motion towards the network component, but also providing some friction holding force. In a further example, in some embodiments, cable block 2590 may include through holes that are just larger than sections of cables 2592, allowing cables 2592 to be secured in an unconnected state, as shown in FIG. 25. In a further example, in some embodiments, cable block 2590 may include through holes that are larger than sections of cables 2591, allowing cables 2591 to be moved through cable block 2590 (e.g., and connected to connector port 2595), as shown in FIG. 25. Cable block 2590 helps prevent cables 2591 and 2592 from getting tangled among one another or among cables 2560.

Figure 26:
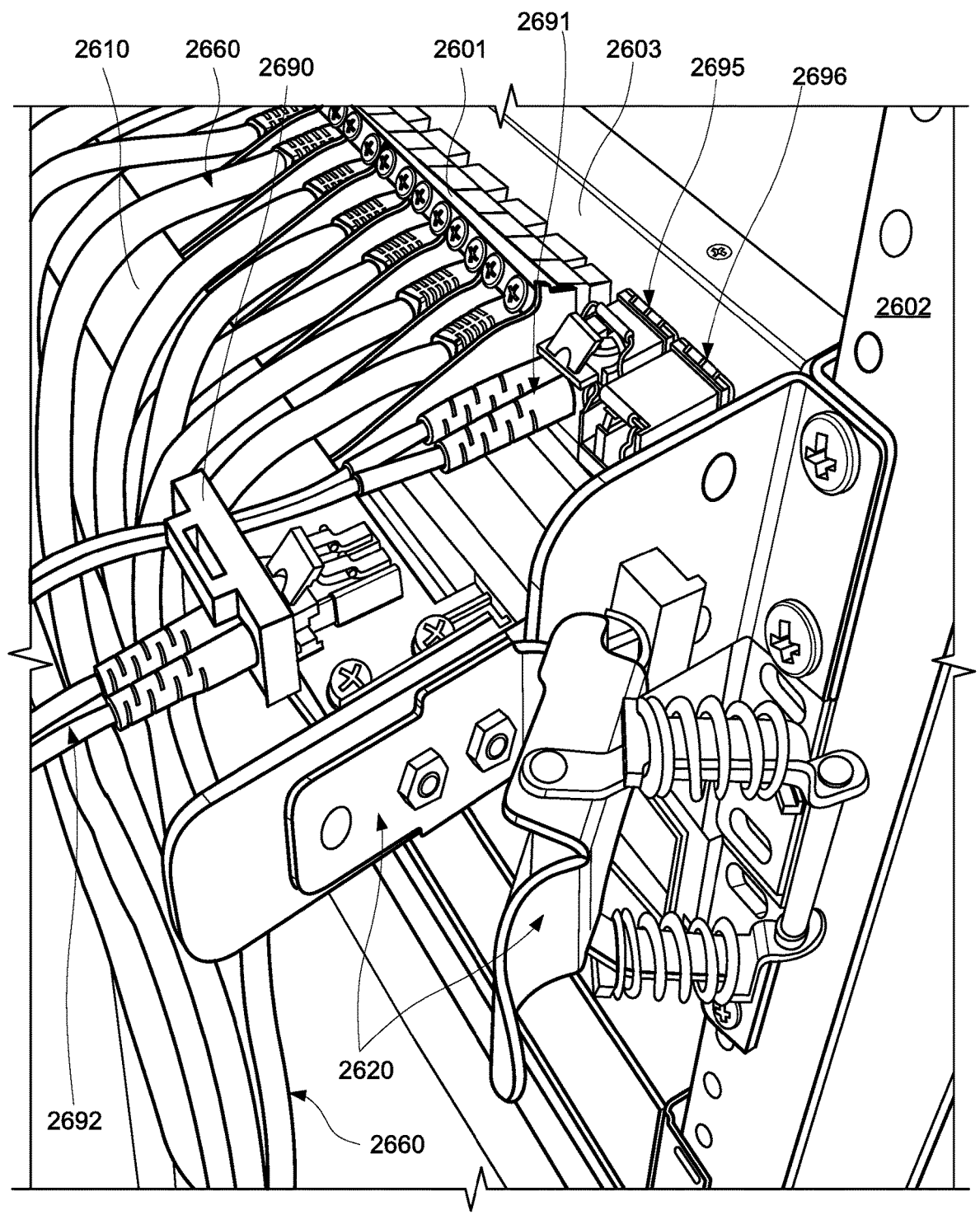
FIG. 26 shows a perspective view of a system including a cable block and latching mechanism, in a partially latched state, in accordance with some embodiments of the present disclosure.

FIG. 26 shows a perspective view of a system including cable block 2690 and latching mechanism 2620, in a partially latched state, in accordance with some embodiments of the present disclosure. Network component 2603, to which the system is installed, includes optical fiber connector ports 2695 and 2696. Network component 2603 is mounted to rack 2602. Connector block 2601 includes connector bays configured to accommodate connectors of cables 2660. Cables 2660 each have a respective connector (e.g., a RJ45 connector). Latching mechanism 2620 includes latching components (e.g., similar to components illustrated in FIGS. 19-25) configured to secure and release crossbar 2610 to rack 2602.

Network component 2603 includes connector ports 2695 and 2696, configured to accommodate connectors of cables 2691 and 2692 respectively (e.g., fiber optic cables having optical connectors). Cable block 2690, which is mounted to crossbar 2610, is configured to allow cables 2691 and 2692 to pass through to network component 2603. For example, in some embodiments, cable block 2690 may include through holes that are just larger than cables 2691 and 2692, allowing motion towards the network component, but also providing some friction holding force. In a further example, in some embodiments, cable block 2690 may include through holes that are just larger than sections of cables 2692, allowing cables 2692 to be secured in an unconnected state, as shown in FIG. 26. In a further example, in some embodiments, cable block 2690 may include through holes that are larger than sections of cables 2691, allowing cables 2691 to be moved through cable block 2690 (e.g., and connected to connector port 2695), as shown in FIG. 26. Cable block 2690 helps prevent cables 2691 and 2692 from getting tangled among one another or among cables 2660.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for managing a plurality of connectors interfacing with a component having a plurality of connector ports, the system comprising:
a connector block comprising:
at least two connector bays arranged in an array matching at least two corresponding connector ports of the plurality of connector ports; and
at least two respective spring tabs, each corresponding to a respective connector bay of the at least two connector bays, and configured to depress a connector tab of a respective connector of the plurality of connectors,
wherein the connector tabs of the respective connectors are configured to engage with the corresponding connector ports of the at least two corresponding connector ports; and
wherein the at least two respective spring tabs persistently prevent the connector tabs of the respective connectors from ever latching to the at least two corresponding connector ports; and
a crossbar configured to:
interface with a mounting reference coupled to the component; and
secure the connector block to prevent relative motion between the connector block and the mounting reference.

2. The system of claim 1, further comprising a latching mechanism coupled to the mounting reference, wherein the crossbar is configured to interface with the mounting reference using the latching mechanism.

3. The system of claim 1, wherein the mounting reference is a standard rack.

4. The system of claim 1, wherein the component comprises a network switch, a network router, a network patch panel, or a network server.

5. The system of claim 1, wherein the plurality of connectors is configured to couple with connector ports comprisin a plurality of RJ45 ports.

6. The system of claim 1, wherein:
the array comprises a first row and a second row; and
the first row and the second row each comprise a same number of connector ports of the plurality of connector ports as the other.

7. The system of claim 2, wherein:
the latching mechanism comprises at least one spring-loaded clamp;
the at least one spring-loaded clamp, when latched, is configured to impart a force on the crossbar which is reacted against the connector block, wherein the force is transmitted from the connector block to each respective connector reacted against the component; and
the at least one spring-loaded clamp, when de-latched, is configured to release the force on the crossbar.

8. The system of claim 1, wherein the connector block further comprises:
at least one fastener corresponding to the respective connector bay, configured to secure the respective connector of the plurality of connectors.

9. The system of claim 1, wherein the plurality of connectors have a corresponding plurality of cables, the system further comprising a cable block configured to maintain a relative arrangement of two or more cables of the corresponding plurality of cables and a second plurality of cables of a different type than the corresponding plurality of cables.

10. The system of claim 1, wherein the connector block is a first connector block, and wherein the system further comprises a second connector block, wherein the second connector block comprises:
at least two second connector bays arranged in a second array matching at least two second corresponding connector ports of the plurality of connector ports;
at least two respective second spring tabs, each corresponding to a respective second connector bay of the at least two second connector bays, and configured to depress a second connector tab of a respective second connector of the plurality of connectors, wherein the respective second connector is of a different type than the respective connectors of the plurality of connectors; and
the crossbar is further configured to secure the second connector block to prevent relative motion between the second connector block and the mounting reference.

11. The system of claim 1, wherein the plurality of connectors are separated from the plurality of connector ports without individually separating a plurality of connector tabs corresponding to the plurality of connectors from corresponding connector ports of the plurality of connector ports.

12. A system for managing a first set of connectors interfacing with a component at a first connector port array, and a second set of connectors interfacing with the component at a second connector port array, the system comprising:
- a connector block comprising a first set of connector bays configured to arrange the first set of connectors in the first connector port array and rigidly maintain respective relative positions among the first set of connectors,
- wherein a respective connector tab of a corresponding connector of the first set of connectors is configured to engage with a corresponding connector port of the first connector port array, and
- wherein a corresponding spring tab of a connector bay of the first set of connector bays persistently prevents the respective connector tab from ever latching to the corresponding connector port;
- a cable block configured to arrange corresponding cables of the second set of connectors to maintain a relative arrangement of two or more cables of the corresponding cables, wherein the first set of connectors is of a different type than the second set of connectors;
- a crossbar configured to rigidly couple the connector block to the cable block; and
- a latching mechanism configured to secure and release the crossbar to and from the component.

13. The system of claim 12, wherein the latching mechanism, when latched, is configured to:
- prevent relative motion between the connector block and the component; and
- prevent relative motion between the cable block and the component.

14. The system of claim 12, wherein the latching mechanism comprises two latches, and wherein a latch of the two latches is configured to secure and release the crossbar to and from the component by a single motion.

15. The system of claim 12, wherein the component comprises a network switch, a network router, a network patch panel, or a network server.

16. A method for managing a plurality of connectors interfacing with a component having a connector port array, the method comprising:
- securing a respective connector of the plurality of connectors to a respective connector bay of a connector block;
- engaging the respective connector with a respective connector port of the connector port array,
- wherein a respective connector tab of the respective connector is configured to engage with the respective connector port, and
- wherein a corresponding spring tab of the respective connector bay persistently prevents the respective connector tab from ever latching to the respective connector port;
- securing the connector block to a crossbar; and
- securing the crossbar to the component using at least one latching mechanism.

17. The method of claim 16, wherein the securing the respective connector to the respective connector bay of the connector block comprises tightening a respective threaded fastener of the respective connector bay against the respective connector.

18. The method of claim 16, further comprising releasing the secured crossbar from a rack to disengage the plurality of connectors from respective ports while maintaining a same spatial position among the plurality of connectors.

19. The method of claim 16, comprising, maintaining a relative arrangement of a plurality of cables corresponding to the plurality of connectors with a cable block.

20. The method of claim 19, wherein the plurality of connectors comprise two or more different types of connectors.

* * * * *

UNITED STATES PATENT AND TRADEMARK OFFICE
CERTIFICATE OF CORRECTION

PATENT NO. : 11,012,765 B2
APPLICATION NO. : 16/137005
DATED : May 18, 2021
INVENTOR(S) : Widmann et al.

It is certified that error appears in the above-identified patent and that said Letters Patent is hereby corrected as shown below:

In the Specification

In Column 7, Line 14, after "connector" delete "spring".

In the Claims

In Column 14, Claim 5, Lines 16-17, delete "comprisin" and insert --comprising--, therefor.

Signed and Sealed this
First Day of August, 2023

Katherine Kelly Vidal
Director of the United States Patent and Trademark Office